May 22, 1951 — R. R. FACCHINI — 2,554,100
FLUID LEVEL GAUGE
Filed July 28, 1948
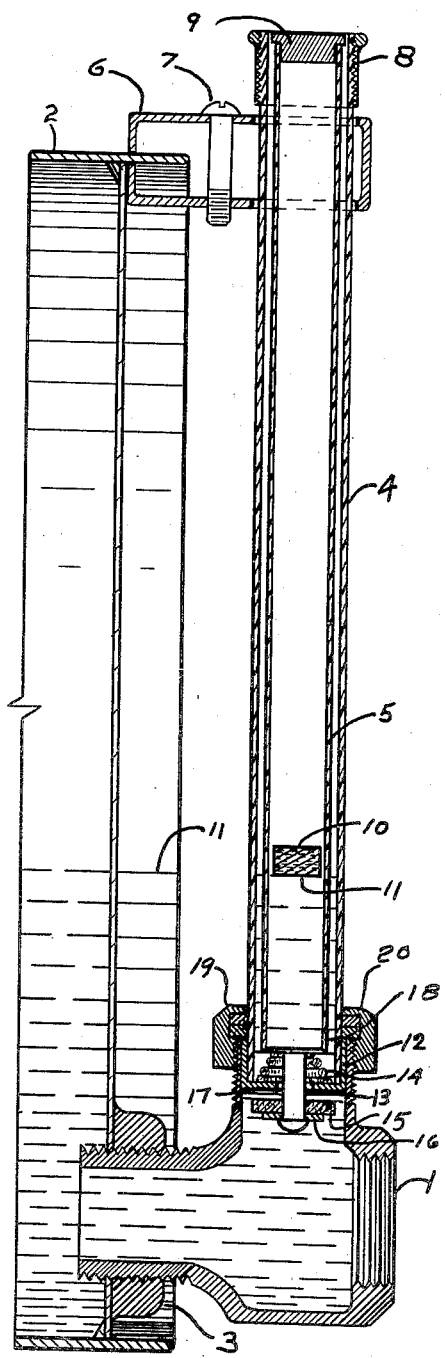
Fig., 1.
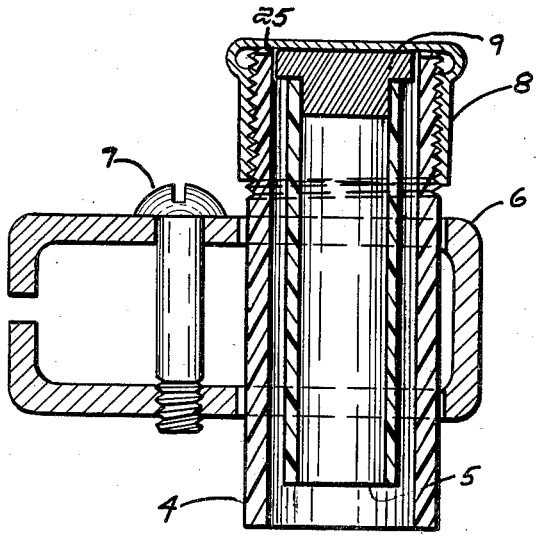
Fig., 3.
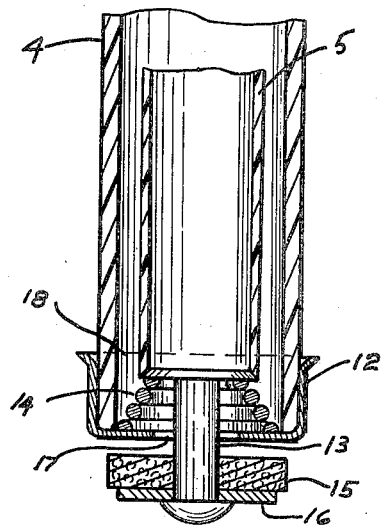
Fig., 2.
INVENTOR.
Rigo Ralph Facchini
BY James R. Hodder
ATTORNEY Patented May 22, 1951

2,554,100

UNITED STATES PATENT OFFICE 2,554,100

FLUID LEVEL GAUGE

Rigo Ralph Facchini, Kington, Mass.

Application July 28, 1948, Serial No. 41,125

3 Claims. (Cl. 73—323)

The present invention relates to improvements in fluid level gauges and the like, and particularly to gauges operating on the principle utilizing the natural law that "liquids seek their own level," and has for its prime object the provision of visible tube means which is of distinctly simple, compact, and light weight construction and also fire-prevention means that will be fool-proof and unfailing in emergency. The invention further includes particularly simple means of attachment to any standard fluid container for use under any of the situations which such gauges are used.

The invention consists in the novel features and in combination and construction hereinafter set forth and claimed.

Universally, tanks or drums have been used for the storage of coal oil, or what is commonly termed range or fuel oil, and likewise such containers are also used for the storage of other chemical liquids such as alcohol, naphtha, and like compounds.

Heretofore it has been customary for the indicators for such drums or tanks to be fitted into the top lateral bung of such containers and for the indications of the fluid level within the container to be shown by various costly mechanical, electrical, or hydraulic devices that from time to time require attention and repairs. My present invention, however, obviates the above difficulties by comprising an outer plastic tube with a smaller plastic tube coaxially disposed within its annular channel and having within its own annular channel a vividly colored buoyant float indicator, the inner tube having at its uppermost extremity a fusible metal fire prevention plug molded of so-called "Underwriters" metal, and provided with air vent means, which plug will melt at a predetermined temperature below the flash point of the containers' contents.

At the lower end of the inner plastic tube are positioned slots whereby the fluid within the container may flow upwardly and inwardly and cause the vividly colored buoyant float to indicate the container's level by floatation upon the surface of the fluid within the annular channel, said level being identical with that within the container by reason of the natural law that "liquids seek their own level." Said plastic tubes are attached to the container by means of an adapter-coupling supplied with male and female threaded portions allowing it to be threadedly engaged in the lower bung of the container, and further permitting the insertion of a conventional drum faucet in its female threaded portion to allow withdrawal of the container's contents at will.

In said adapted coupling having a recessed portion axially disposed therein and extending vertically within said recessed portion is fitted a spring-actuated safety valve mechanism, which valve is held in open position by the pressure applied to its uppermost portion by the inner plastic tube, said outer and inner plastic tubes being held firmly and liquid-tight within the recessed portion by means of washers positioned concentric to the circumference of the outer plastic tube, and secured by means of a hexagon nut threadedly attached to said recessed portion, the entire gauge assembly being held firmly in place by means of a rectilinear clamp attached to the upper rim of the container and held in place by means of a machine screw, said plastic tubes passing therethru by means of cylindrical apertures therein and having upon the uppermost portion of the outer plastic tube a metal cap provided with adjustable screw means and to maintain the required pressure to hold the safety valve open under ordinary conditions and allow admission and change of level within the container to be recorded by the vividly colored buoyant float within the annular channel of the inner control tube.

In event of fire surrounding the container, the aforesaid fusible metal plug disposed in the top portion of the inner plastic tube will fuse or melt at a predetermined temperature and automatically close the safety valve positioned at the base of said tube, preventing the container's contents from flowing outwardly and, thus, causing fire or explosion. Likewise, should either tube become broken by mechanical means, the release of pressure upon the spring of the safety valve will automatically close the safety valve, preventing the container's contents from running outward into the surrounding area.

The rectilinear top clamp is provided with cylindrical apertures thru its plane surfaces to allow the gauge to be adapted to drums or containers of varying diameter, for there is a great variance in the diameter of fluid containers of the tank and drum type.

For many years drums and containers of fifty-five and one-hundred-and-ten gallon capacity have been in use domestically and industrially for the storage of petroleum fuel for oil burners and other uses, and but few such containers have been equipped with means for determining the amount of such fluid within the container, save by the insertion of a graduated ruler or stick inserted in the top lateral bung thereof, which ruler upon being withdrawn designates the level within the tank as shown by the moist line left by the container's contents. Mechanisms are now available for determining such fluid levels.

However, such devices involve complicated mechanisms which are costly to manufacture and purchase, and most of these devices require some service attention from time to time, due to the methods used in their construction to convey knowledge of the container's level to visible means without the container.

The simplicity of the construction of my invention, which works on a well known law of nature, that is, "fluids seek their own level," makes it a device that not only is economically manufactured but also may be sold at equally low prices, yet it has no parts that normally require attention, once the device is installed on any container.

My device allows the user visible means of determining the exact level of the fluid in the container at all times, and likewise allows the tank wagon operator to gauge his filling operations, and the user to know the exact amount of fluid supplied to him by the delivery medium.

In large poultry establishments using oil-fired incubators, the use of my device has been found of great value, for large fields of hen brooders having within each brooder house an oil-fired incubator requires a container or tank for each incubator, which must never be allowed to become empty during the incubation period. My device gives visible knowledge of the amount of fuel in each of the many tanks or containers, and allows the caretaker or tank wagon man to immediately ascertain as to whether oil is needed, and also allows him to estimate when each refill is needed to insure continuous heat to the eggs in the incubator.

In the home, such a device is of great help in that it is not necessary to soil the hands or garments in gauging the tank, as is invariably the case when the yard-stick method of gauging is used, my gauge giving immediate visible knowledge of the fluid level in the container.

The advantages of my instant invention may be summarized briefly as follows, wherein I provide a liquid fuel gauge, which:

1. Replaces gauging devices entailing intricate mechanical, electrical, and hydraulic means that require some service and repair from time to time.
2. May be manufactured and sold at a low cost.
3. Actually represents visibly the level of fluid content within the container to which it is attached.
4. Includes accurate means of determining the amount of fluid delivered by a tank wagon operator.
5. Is not affected by changes of atmospheric temperature.
6. Features safety means against fire or mechanical damage to the gauge glass.
7. Has a non-breakable indicating gauge tube.

While I have illustrated a preferred embodiment of my invention, many modifications may be had without departing from the spirit of the invention, and I do not wish to be limited to the precise details of construction set forth, but desire to avail myself of all changes within the scope of the appended claims.

With reference to the drawing, in which like numerals signify like parts:

Fig. 1 is a vertical sectional view of my gauge attached to a standard oil drum;

Fig. 2 is a fractional vertical sectional view of the top clamp, screw cap, and fire-prevention plug, greatly enlarged; and Fig. 3 is a fractional vertical sectional view of the fire valve assembly greatly enlarged for clarity.

Referring to the drawing, 1 is an adapter-coupling supplied with male and female threaded portions and a recessed portion axially disposed upwardly and carrying a male threaded portion on its circumference. 2 is a conventional oil drum; 3 is a lower bung of the conventional drum; 2 and 4 is an outer plastic gauge tube; 5 is an inner plastic gauge and valve control tube; 6 is the rectilinear clamp; 7 is a machine screw; 8 is a metal screw cap valve adjustment; 9 a metal plug molded of "Underwriters" metal which fuses at a predetermined temperature; 10 is a vividly colored float of buoyant material; 11 is an oil level within the drum 2 and as shown in the inner tube 5 by float 10; 12 is a cup containing the safety valve assembly; 13 is a flat headed rivet; 14 is a pyramid compression spring; 15 is a composition valve washer; 16 is a non-corrosive metal washer.

17 is a cylindrical aperture of a diameter larger than that of the rivet 13, allowing fluid from drum 2 to enter or recede from plastic tube assembly. 18 are slots cut in the base of tube 5 to allow ingress and egress of drum fluids to annual channel of said tube 5, which floats the colored indicator 10 and indicates the level 11 in the container. 19 is a hexagon nut securing the bottom of the gauge assembly firmly in place. 20 are composition washers surrounding the circumference of tube 4 and held in position liquid-tight by the pressure exerted by hexagon nut 19; and 25 are slots cut in the top portion of tube 5 to allow air to be expelled or drawn in due to the change of level in drum 2.

My gauge is attached to any standard drum or container by the insertion of male-threaded portion of the adapter-coupling 1 into the lower front bung 3 of the drum or container 2 and a conventional faucet (not shown) inserted into the female threaded portion of said adapter-coupling to allow withdrawal of the container's liquid therefrom, said adapter-coupling 1 having an annular channel running axially therethru and having an uptake recessed portion vertically positioned thereon with a threaded portion at its upper circumference permitting the application of a hexagon nut 19.

Outer plastic tube 4 and inner plastic tube 5 are assembled with tube 5 positioned within the annular channel of tube 4, and washer 20 composed of composition packing material are slipped over the outer circumference of tube 4 at its lower end.

The assembled plastic tubes 4 and 5 are then inserted into the valve cup 12, tube 4 positioned at the extreme bottom of cap 12, and tube 5 with its fluid slots 18 positioned on the flat portion of rivet 13, which flat-headed rivet is supported by means of a pyramid compression spring 14, and which passes downwardly thru aperture 17 of the cylindrical bottom of cap 12; and thru which aperture the fluid within the container flows freely to the gauge tubes above. Also below the bottom of the cylindrical cap 12 is supported a valve-seat washer 15, comprised of a composition packing material and held on said rivet 13 by means of a metal washer 16 and the round head of rivet 13. The valve-seat washer 15 is held away from the bottom of the cap 12 in normal operation by reason of the pressure exerted upon the flat head of rivet 13 by the inner tube 5, and thru such opening the fluid from the container flows upwardly thru aperture 17 and thus thru slots 18 in tube 5 reaching the level within the container, which level 11 is recorded by means of the vividly colored buoyant float 10, indicating the true fluid level within the container at 11, 11.

Plastic tubes 4 and 5 assembled with washer 20 are inserted into the valve cap 12, and the entire assembly is inserted into the recessed vertical portion of the adapter-coupling 1 and the hexagon nut 19 tightened in place.

The plastic tube 5 inserted into the annular channel of tube 4 and carrying within its annular channel the vividly colored buoyant float 10 is secured firmly and liquid-tight in the recessed vertical portion of adapter-coupling 1 by means of packing washers 20 and hexagon nut 19, and gauge tubes 4 and 5 positioned vertically on the face of drum 2 are held in place by means of a rectilinear clamp 6 secured to the container's upper rim by the machine screw 7, said rectilinear clamp having pierced thru its plane surfaces apertures permitting the tube 4 with its inner tube 5 to pass therethru. The top portion of tube 4 is provided with thread means by which adjustable screw cap 8 may be threadedly positioned to apply pressure on fire-prevention plug 9 and tube 5, which is provided with vent means 25 to allow air to be expelled or drawn in due to the change of level of the fluid within the container or drum 2.

I claim.

1. A fluid level gauge of the kind described, comprising an adapter constructed to be attached to the lower portion of a tank to permit liquid flow therethru, an outer gauge tube secured to said adapter, an inner pressure control tube of less diameter than the interior of the outer tube, a fusible plug attached to adjacent ends of both tubes and holding the said tubes in spaced relation, said inner tube being axially disposed within the outer tube and forming an annular channel between said tubes, both tubes being normally open to fluid flow from said adapter, a buoyant indicator floatable within said inner tube, a cap secured to said adapter and to the bottom portion of the outer tube, said cap having a central opening thru the bottom, a valve stem slidably fitted in said opening and having on its upper end a valve seat adapted to register with the open end of the inner tube, and a valve washer on the opposite end of said stem of sufficient area to close the opening thru said cap, a coiled spring interposed between the valve seat engaging the inner tube and the cap, said spring automatically actuating the valve closure to close the fluid opening thru the cap upon breakage of the inner tube.

2. A fluid level gauge as set forth in claim 1, wherein a fusible plug is fitted in the top of the inner tube and secured to said outer tube, whereby on melting of the fusible plug the inner tube will be forced upwardly by the coiled spring, and close the valve washer against said opening in the cap.

3. A fluid level gauge of the kind described, comprising an outer gauge tube, a cup-shaped cap attached to the bottom end of said tube and having a central opening thru said cap, an inner pressure-controlled tube of less diameter than the interior of the outer tube, said inner tube being axially disposed within the outer tube, both tubes being normally open to fluid flow thru the opening in said cap, a buoyant indicator floatable within said inner tube to indicate fluid level, a valve stem passing thru the opening in said cap and supporting the inner tube, said stem having an outer valve washer of greater area than the opening thru the cap, an expansible spring bearing between the cap adjacent the central opening and the inner valve stem support in contact with the inner tube, a fusible plug at the opposite end of the inner tube and attached to the adjacent walls of the outer tube, whereby upon release of the fusible plug said spring will move the inner tube upwardly and close the valve washer against the opening thru the cap.

RIGO RALPH FACCHINI.

No references cited.